US008180156B2

(12) United States Patent
Goeller

(10) Patent No.: US 8,180,156 B2
(45) Date of Patent: May 15, 2012

(54) METHOD AND DEVICE FOR MACHINE-CUTTING A PLATE-SHAPED WORKPIECE

(75) Inventor: Ingo Goeller, Gross-Umstadt (DE)

(73) Assignee: Messer Cutting Systems GmbH, Gross-Umstadt (DE)

( * ) Notice: Subject to any disclaimer, the term of this patent is extended or adjusted under 35 U.S.C. 154(b) by 1236 days.

(21) Appl. No.: 11/977,015

(22) Filed: Oct. 23, 2007

(65) Prior Publication Data

US 2008/0101687 A1    May 1, 2008

(30) Foreign Application Priority Data

Oct. 24, 2006 (DE) .......................... 10 2006 050 686
Apr. 17, 2007 (DE) .......................... 10 2007 018 416

(51) Int. Cl.
*G06K 9/48* (2006.01)
(52) U.S. Cl. ........................................ 382/199; 382/152
(58) Field of Classification Search ................... 382/152, 382/199, 298, 194
See application file for complete search history.

(56) References Cited

U.S. PATENT DOCUMENTS

| | | | |
|---|---|---|---|
| 4,187,051 A | 2/1980 | Kirsch et al. | |
| 5,285,397 A | 2/1994 | Heier et al. | |
| 5,323,473 A * | 6/1994 | Lau | 382/175 |
| 7,187,436 B2 | 3/2007 | Harding et al. | |
| 2004/0066964 A1 * | 4/2004 | Neubauer et al. | 382/152 |
| 2005/0219519 A1 | 10/2005 | Harding et al. | |
| 2008/0101687 A1 | 5/2008 | Goeller | |

FOREIGN PATENT DOCUMENTS

| | | |
|---|---|---|
| DE | 39 41 144 A1 | 6/1991 |
| DE | 100 16 195 A1 | 10/2001 |
| EP | 1 342 527 A1 | 9/2003 |
| EP | 1 582 863 A1 | 10/2005 |
| JP | 11-248643 | 9/1999 |

OTHER PUBLICATIONS

Espacenet English language abstract for DE 100 16 195 A1, Oct. 11, 2001.
European Patent Office Abstract of JP 11248643, published Sep. 17, 1999, Sekisui Chem Co. Ltd.
Japanese Patent Office Abstract of JP 11248643, published Sep. 17, 1999, Sekisui Chem Co. Ltd.

* cited by examiner

*Primary Examiner* — Tarifur Chowdhury
*Assistant Examiner* — Jonathon Cook
(74) *Attorney, Agent, or Firm* — Tiajoloff & Kelly LLP

(57) ABSTRACT

In a known method for machine-cutting a plate-shaped workpiece, position and/or geometry and/or dimensions of the workpiece are detected without contact by means of a camera and the corresponding data are subjected to an evaluation by means of image processing. Starting from this, to permit a precise and reproducible detection of the position and/or geometry and/or dimensions of the workpiece to be treated without spending a lot of time, it is suggested according to the invention that the recording of the data should comprise a method step for the coarse localization of a workpiece edge, in which the camera is operated in a first operative mode with lower optical resolution, and a second method step for determining the exact positional data of the found workpiece edge, in which the camera is operated in a second operative mode with higher optical resolution.

15 Claims, 2 Drawing Sheets

METHOD AND DEVICE FOR MACHINE-CUTTING A PLATE-SHAPED WORKPIECE

The present invention relates to a method for machine-cutting a plate-shaped workpiece, comprising contactless optical detection of the position and/or geometry and/or dimensions of the workpiece by means of a camera, and evaluation by means of image processing.

Furthermore, the present invention relates to a device for machine-cutting plate-shaped workpieces, comprising a camera for contactless optical detection of the position and/or geometry and/or dimensions of the workpiece, and an evaluating device with image processing of data recorded by means of the camera.

The procedures and devices known from the prior art and their drawbacks shall be explained in more detail in the following with reference to FIG. 3.

Figure 3:
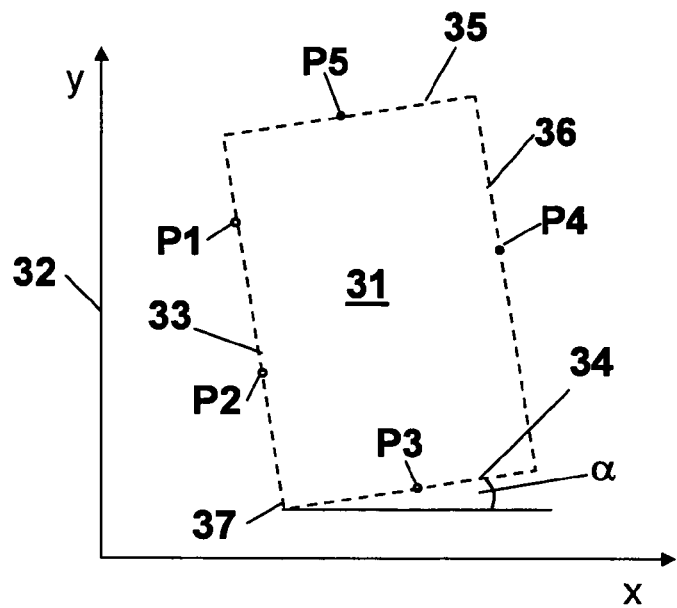

FIG. 3 shows the detection of the position and size of a rectangular plate 31 relative to the machine coordinate system 32. First of all, the angle α is determined, which describes the position of the main axes of the plate relative to the machine coordinate system 32.

To this end, two points P1 and P2 are needed that are located on a joint edge 33 of the plate 31.

For the determination of a corner point 37 of the plate 31 a third point P3 is needed that is located on the further edge 34 of the corner point 37 to be determined. The corner point 37 is then positioned in the point of intersection of the edges 33, 34.

For the determination of the width and size of the plate 31 further points P4 and P5 must be determined on the two other edges.

Many methods are known for recording points P1 to P5. In the simplest case the recording is carried out manually. This method, however, is inaccurate and time-consuming.

With an automatic recording of points P1 to P5, a mechanical or optical sensor is moved in the direction of the x- or y-axis for recording a point each time from a predetermined point on the plate until the "loss" of the plate 31 is reported. At a slower speed the sensor is now moved in the opposite direction until it detects some material again. The sensor signal, however, is prone to failure; to be more specific, the sensor is influenced by the plate support, which is normally a grid.

Complicated coordinate measuring devices are used for measuring objects. These devices consist most of the time of three displacement axes that are arranged relative to each other such that they form a Cartesian coordinate system. The position of the individual displacement axes is in general determined by a respective length measuring system. In the coordinate measuring device described in DE 39 411 44 A1, several pivotable video cameras sense the geometry of the structural part to be treated.

DE 100 16 195 A1 discloses a further coordinate measuring device for optically measuring objects using a camera and an illumination unit. In this case the camera takes a picture of an object to be measured in the back light of the illumination unit, the object being arranged between the illumination unit and the camera so that it hides part of the light beams incident from the illumination unit into the camera. This arrangement produces a high-contrast image, which facilitates the evaluation of the image information gained in this way by digital image processing. Lasers or light-emitting diodes are used as the light source.

An exact measurement of objects with the help of the known methods requires a troublesome adjusting operation, a lot of time and the observance of constant ambient parameters during the measuring operation. This constancy, however, cannot be ensured easily in the flame cutting of workpieces under production conditions found in ordinary manufacturing shops. For example, the illumination of the workpiece can permanently change due to the movement of persons and machines in the surroundings. Likewise, the huge expenditure of time is normally not acceptable under production conditions.

In this respect it is the object of the present invention to indicate a method which, while requiring hardly any time, permits a precise and reproducible detection of the position and/or geometry and/or dimensions of the workpiece to be treated, also under production conditions, and to provide a device suited therefor.

Furthermore, it is known that technical drawings are digitalized and the data are fed into the machine control. In this process the recorded contour is scanned with the help of a photoscope, recorded as x- and y-coordinates in the machine control and combined to form a part section. The method, however, is very slow and inaccurate and only permits the detection of outer contours.

Similarly, remaining plates are also digitalized. Points on the contour of the remaining plate are here manually approached, and the data are fed into the machine control and combined to form a remaining plate. The method, however, is inaccurate and time-consuming and does not permit a recording of circular contours or inner contours.

In this respect it is also the object of the present invention to indicate an improved method for digitalizing technical drawings and remaining plates. As regards the method, this object, starting from the above-mentioned method, is achieved according to the invention in that the detection comprises a method step for the coarse localization of a workpiece edge, in which the camera is operated in a first operative mode with lower optical resolution, and a second method step for determining the exact positional data of the found workpiece edge, in which the camera is operated in a second operative mode with higher optical resolution.

In the method according to the invention, position and contour of a workpiece are recorded by means of a camera and image processing. For determining a workpiece edge the imaging area of the camera is moved above the workpiece surface. In this movement the camera is normally guided over the workpiece surface, but it may also be mounted such that it is stationary.

The workpiece edge is coarsely localized in a first operative mode in which the camera is operated with lower resolution. This permits a fast scanning of the surface, which shall also be called "search travel" in the following. Whenever a workpiece edge has been localized in this way, the camera is switched into a second operative mode of higher optical resolution and a picture of higher resolution is taken of the area in question. This picture or recording is evaluated by means of image evaluation. The higher resolution permits an exact positional detection of the corresponding edge and thus also of the positional angle α relative to the machine coordinate system.

The remaining edges and corner points can be determined in the same way, as has been explained above with reference to the description of FIG. 3. The method of the invention, however, permits another faster procedure, for after a workpiece edge has been found, the camera or the imaging portion of the camera can be moved along the edge up to a corner point and from there along the whole contour, whereby the workpiece contour can be determined very rapidly. The complete position and edge detection of the workpiece thus follows from a sequence of search travels, recordings and evaluations.

By this coarse to fine localization of the contour high performance and exact results can be achieved at the same time. The method is substantially independent of the material of the workpiece and is e.g. suited for workpieces made of metal, plastics, wood, ceramics or glass.

Preferably, an image is produced in the area of the found workpiece edge by means of the camera during operation in the second operative mode of higher optical resolution, and the image is evaluated by means of image processing.

In a particularly preferred variant of the method the recording of the data comprises the following method steps:

a) positioning the camera such that a recording of a first sub-area of the surface of the workpiece is obtained;
b) setting first recording parameters of the camera corresponding to the first operative mode in such a way that the recording shows a high white level with predominantly white pixels, and evaluating the recording while gaining a first group of recording and positional data;
c) moving the camera in the first operative mode in the predetermined direction of movement by a predetermined movement path such that a recording of a further current sub-area is obtained, which sub-area is arranged offset relative to the preceding sub-area and overlaps with said sub-area in an overlap region, and evaluating the recording while gaining a current group of recording and positional data;
d) matching the recording data of former and current group or evaluating the recording data of only the current sub-area for detecting whether or not the white level of the recording of the current sub-area falls short of a predetermined relative or absolute limit value, and thereafter
e) either (in case of no) further moving the camera in the first operative mode in the predetermined direction of movement and by the predetermined movement distance and iteratively repeating method steps c) and d) for recording and evaluating the recording data of at least a further current sub-area;
f) or (in case of yes) setting second recording parameters which correspond to the second operative mode of the camera and permit a higher resolution in comparison with the first recording parameters, and producing a recording of higher resolution from the sub-area with a white level below the limit value, and evaluating the recording with respect to the position of a workpiece edge.

The camera or the recording portion of the camera is thus first positioned above the surface of the workpiece, thereby obtaining a picture or recording of a first sub-area. The camera is here in or set into the first operative mode, namely such that the surface of the workpiece appears substantially white (or ideally completely white). This is done e.g. by setting a high contrast value. Thus the recording made in this way consists essentially of white pixels, which is here designated as a high "white level". The white level of the sub-area in question and its positional data are determined with respect to the machine coordinate system and stored.

Thereupon, the camera (or the detection area of the camera) is moved in the first operative mode and thus very rapidly, in a predetermined direction of movement, and recordings of successive sub-areas are continuously made, also very rapidly, each of said sub-areas slightly overlapping with the preceding sub-area. At the same time and without any interruption of the search travel, the respective recording is evaluated with respect to its "white level" and the local position, and at least the positional data are stored. Moreover, the evaluation comprises a comparison with a predetermined limit value for the white level, and as an alternative or supplement thereto, a comparison with the white level of the preceding recording (this matching is here also called "light/dark comparison").

The sub-areas up to a workpiece edge are thereby very rapidly scanned by successively passing on the camera in the same direction of movement. As a rule, the workpiece surface appears here for the camera as an approximately uniformly white surface. In the area of a workpiece edge, however, more and more dark (black) pixels are detected, which may be surrounded by light pixels (which are e.g. due to the bars of a cutting grid).

If a preset or variable limit value for the white level is not reached any more and/or if there is a difference between the two white levels of overlapping sub-areas that exceeds a limit difference value, this is regarded as a sign of the presence of a workpiece edge.

Of the sub-surface that became conspicuous in the light/dark comparison, or of a selected sub-area thereof, a further recording is then made by the camera, but this time with a higher resolution. The higher resolution may contain a higher pixel number per unit of area and/or a greater optical magnification and/or a greater number of colors. The recording of higher resolution is thereupon evaluated by image evaluation and, on the basis of this, the position of the workpiece edge is determined.

Moreover, an exact recording of chamfered workpiece edges is thereby made possible.

With respect to this procedure it has turned out to be advantageous when the first recording parameter of the camera in method step b) is set such that the recording shows a white level with at least 80%, preferably at least 90%, white pixels.

With a high white level, possible dark spots are brightly illuminated so that they disappear, resulting in high evaluation sensitivity, so that misinterpretations are avoided despite a high scanning speed.

Moreover, it has turned out to be useful if, in case of yes, method step f) is pre-ceded by a measure in which surface areas of the recording with predominantly black pixels are optically or mathematically eliminated.

This measure is taken because of the fact that, whenever the workpiece surface or a technical drawing is scanned, the support of the workpiece (e.g. a cutting grid) or the outer border of the drawing sheet, where bright areas surrounded by dark areas may be present, is always co-recorded. These bright areas that cannot be attributed to the workpiece may falsify the detection of the edge position. Therefore, the areas with light pixels that are surrounded by dark pixels are mathematically or optically reduced in size or eliminated, for instance by mathematically increasing the dark areas, or by excessive illumination or overmodulation of the camera. The smaller areas with light pixels are thus disappearing, so that in the end the border between light workpiece edge and dark surroundings remains clearly visible. Its position can thus be made out precisely, which facilitates automatic image evaluation. The shift of the edge caused by mathematical or optical reduction in size of the dark pixel areas can be taken into account easily and corrected accordingly.

As a rule, the camera has already been moved on to the next sub-area before the evaluation reveals a conspicuously low white level for a sub-area. Thus a procedure is preferred in which, in case of yes, method step f) is preceded by a measure in which the camera is moved back on the basis of the stored positional data to the sub-area with a white level below the limit value in a direction opposite to the direction of movement.

Hence, the camera is moved back, if necessary, to the sub-area that was conspicuous in the light/dark comparison and whose position has been stored, as has been described above.

Particularly with respect to a detection of position and contour that can be carried out as fast as possible, the camera is moved according to method step c) at a movement speed of at least 20 m/min, preferably at least 35 m/min.

An embodiment of the method according to the invention has turned out to be particularly advantageous, wherein the limit value according to method step d) is set to be variable in dependence upon the white level of the preceding sub-area recording.

The light/dark comparison during scanning of the surface by means of the camera is here carried out with a variable limit value. This avoids misinterpretations that might ensue due to gradual optical changes in the workpiece surface. Particular mention should here be made of shadow effects or changes in the surface quality, such as discolorations or differently reflecting areas. The new limit value is here e.g. formed on the basis of the average white level of the overall current sub-area or also on the basis of the white level in selected areas of the current sub-area, the selected areas being then usually positioned in a section of the current sub-area facing the overlap area with the preceding sub-area.

It has turned out to be useful when a gray scale camera is used as the camera.

In comparison with a color camera a gray scale camera provides higher local resolution at the same amount of data. Appropriate digital cameras are CCD or CMOS cameras.

Furthermore, it has turned out to be advantageous when in the first operative mode the aperture of the camera is set such that a depth of focus of at least 20 mm, preferably at least 30 mm, is obtained.

It is thereby possible to treat also workpieces of different thicknesses without any complicated readjustments because a sharp and exactly analyzable image is always obtained in the second operative mode. To be more specific, this also facilitates the detection of chamfered workpiece edges.

Moreover, it has turned out to be advantageous when a camera is used with an automatic zoom.

This ensures that the camera is always focused onto the surface of the workpiece to be treated.

It is also advantageous in this context when the camera is adjustable in height. As a result, even with changing thicknesses of the workpieces to be measured an optimal working distance can always be observed between workpiece surface and camera (e.g. 50 mm).

Furthermore, it has turned out to be useful when a camera is used with a wide-angle lens.

When a wide-angle lens is used (e.g. with a focal width of 28 mm), a comparatively large area is sensed, at a given working distance, with each recording by means of the camera, whereby the process of edge and position detection is accelerated.

As for the device, the above-indicated object, starting from a device of the above-indicated type, is achieved according to the invention in that the camera can be operated for the coarse localization of a workpiece edge in a first operative mode with lower optical resolution and in a second operative mode with higher optical resolution.

The device according to the invention permits the detection of the position and contour of a workpiece by means of a camera and by image processing. For the determination of a workpiece edge the imaging area of the camera is movable above the workpiece surface. To this end the camera is configured to be movable or it is stationary.

The camera can be operated in at least two operating modes. The coarse localization of the workpiece edge is carried out in a first operative mode in which the camera is operated with low resolution. This permits a fast scanning of the surface. Whenever a workpiece edge has been localized in this way, the camera is switched into a second operative mode with higher optical resolution and makes a recording of higher optical resolution from the corresponding area. This recording is evaluated by means of image evaluation. The higher resolution permits an exact detection of the position of the edge in question and thus of the positional angle α relative to the machine coordinate system.

The remaining edges and corner points can be determined in the same way, as has been explained above with reference to the description of FIG. 3. The method of the invention, however, also permits a different procedure, for after a workpiece edge has been found, the camera or the imaging area of the camera can be moved along the edge up to a corner point and from there along the whole contour, whereby the workpiece contour can be determined very rapidly.

Advantageous developments of the device according to the invention follow from the subclaims. Insofar as developments of the device indicated in the subclaims copy the procedures mentioned in subclaims regarding the method according to the invention, reference is made for supplementary explanation to the above comments on the corresponding method claims.

Figure 1:
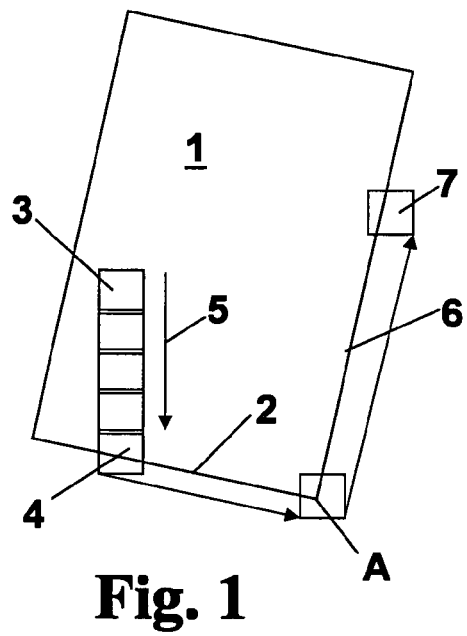
Figure 2:
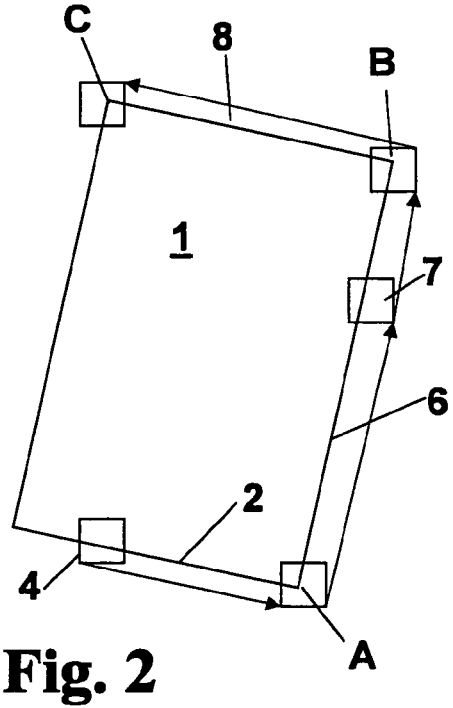
Figure 4:
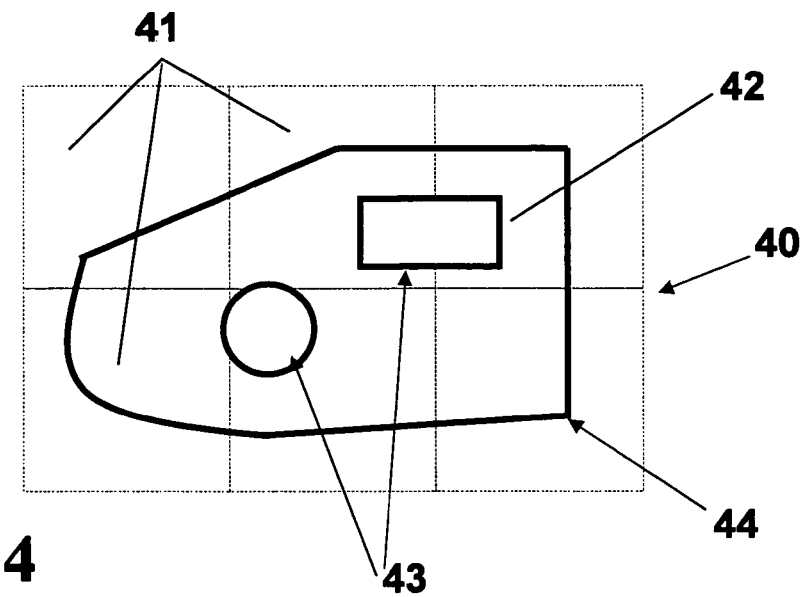
Figure 5:
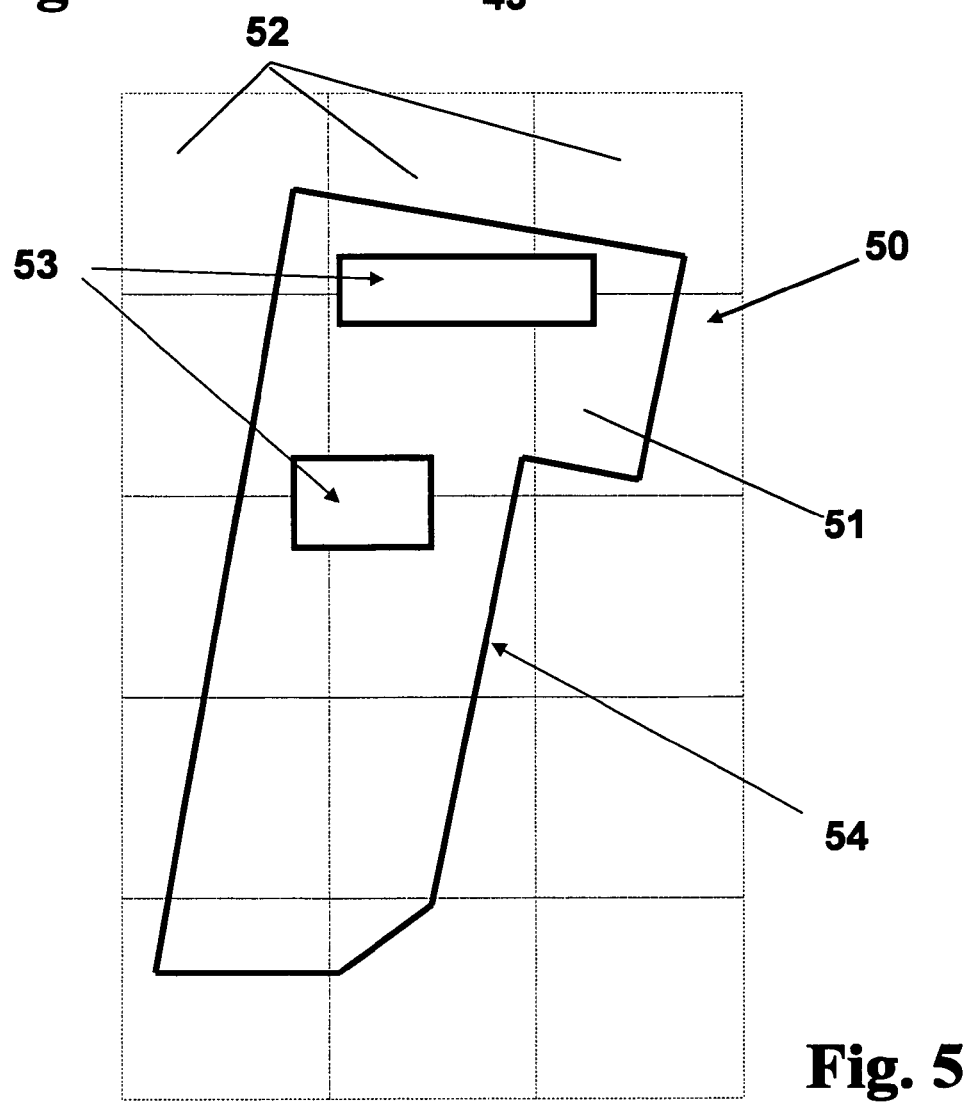

The invention shall now be explained in more detail with reference to embodiments and a drawing, which shows in detail in:

FIG. 1 a schematic illustration for explaining edge localization and contour detection by means of the method according to the invention;

FIG. 2 a schematic illustration for determining the size of a workpiece by means of the method according to the invention;

FIG. 3 a schematic illustration for explaining the procedures known from the prior art;

FIG. 4 a schematic illustration for explaining the digitalization of drawings and structural parts on the basis of the method according to the invention; and FIG. 5 a schematic illustration for explaining the digitalization of remaining structural parts according to the method of the invention.

1. CONTOUR DETECTION BY MEANS OF THE CAMERA FOR DETERMINING PLATE POSITION AND SIZE

The contour detection is carried out by a coarse to fine localization according to the invention.

FIG. 1 refers to the localization of corner A of a workpiece in the form of a rectangular plate. Every other corner can also be found. In this process the start point and/or the directions of the search travel might change.

Step 1:

With the aid of a co-traveling and vertically adjustable CMOS or CCD gray scale camera an edge 2 is detected in the recorded images 3 during travel onto the plate 1 or down from plate 1.

To this end the camera is first positioned at any desired point above the surface of the plate 1 at a working distance of 50 mm. The camera is equipped with an autofocus function and with a wide-angle lens having a focal depth of 28 mm.

The recording parameters of the camera are set such that the surface of plate 1 appears substantially white. This is accomplished by automatically setting a sufficiently long illumination period and a sufficiently high contrast value.

In the recording made in this way of the corresponding sub-area of the surface, the number of the white pixels in the total number of the pixels is 95% (current white level). The ordinary light of the production hall is sufficient for this purpose; an additional illumination of the plate surface is not needed. In the machine control, a corresponding initial limit value for the white level of 95% is stored.

Thereupon the camera is moved with the same recording parameters and at a speed of 35 mm/min in the predetermined direction of movement 5 along the surface of the plate 1. In this process recordings are continuously made of further sub-areas 3 of the surface, each of said sub-areas slightly overlapping with the preceding sub-area. All recordings are evaluated with respect to their "white level" and the local position, and the data are stored. The limit value for the white level is here continuously adapted to the conditions of the last sub-area recording. This adaptation is accomplished such that in the rear third of the current sub-area, i.e. the third closest to the end of the preceding sub-area, the mean value of the white level is determined (in %). On the basis of the value determined in this way, the new current limit value is then determined.

The travel of the camera will be interrupted as soon as the "light/dark comparison" in the recording of a sub-area 4 reveals that the current white level (in %) averaged over the whole sub-area 4 falls short of the current limit value by more than 5%. This hints at a workpiece edge 2.

As a rule, the evaluation of the imaging information follows the camera movement. Therefore, whenever the white-level limit value is not reached, the camera will be moved back on the basis of the stored positional data to the corresponding sub-area 4 that shows an inadmissibly reduced white level.

A further challenge is here that during scanning by means of the camera the cutting grid on which the plate 1 is positioned generates areas with white and black pixels, which may render the determination of the true edge position difficult. Therefore, the areas with dark pixels are optically reduced in size by overmodulation of the camera and thereby eliminated. The recording parameters set in the first operative mode of the camera may already be appropriate for this purpose, depending on the width of the grid structure. As a consequence, minor areas with dark pixels will disappear, so that in the end the border between light workpiece edge and dark surroundings remains clearly visible. A possible optical displacement of the real edge due to an overmodulation of the camera is of no relevance because of the subsequent method steps and can thus also be corrected easily.

Of the sub-area 4 determined in this way, a further recording of a higher optical resolution is made by means of the camera (in the second operative mode). The higher resolution is obtained through a higher pixel number per unit of area.

The recording of higher resolution as produced in this way is then evaluated by means of image evaluation, and the position and angle of the corresponding workpiece edge 2 is exactly determined relative to the machine coordinate system, and the data are stored. The beveled edges can here also be detected and determined.

Step 2:

After the plate edge 2 (position and angle) has been determined, the camera runs a search with the help of the evaluated information in the fast operative mode (low resolution) along edge 2 until the corner A is found in the recordings made in this process. The evaluation is carried out on the basis of a recording of a high resolution. With the collected information the corner point A and the tilt angle of the plate 1 relative to the machine coordinate system can be determined even more accurately.

In case the corner A happens to be located in the evaluated sub-area 4, the search travel along edge 2 in the direction of the corner point is not needed. Otherwise, this search travel is carried out by means of the camera. If the edge A is remote from the sub-area 4, the accuracy of the angle determination process can be enhanced by using a point on the edge 2 of the recording of the sub-area 4 and the corner point A for determining the angle.

To even further enhance the accuracy of the determination of the angle, a recording of a further sub-area 7 can additionally be made in the area of one of the two edges 2, 6 of the corner point A after corner A has been found. The more remote this sub-area 7 is from the corner point A, the more accurate will the angle measurement be. Hence, the recording of the sub-area 4 on the edge 2 with the corner point A and the recording of the remote sub-area 7 are evaluated and used for determining the angle.

In case the corner point A of the plate 1 is always positioned in a defined area smaller than the size of the image (=recording), the corner point can also be approached directly or recorded with a stationary camera.

Step 3:

FIG. 2 schematically shows the process for determining the size of the plate 1 after the plate position has been localized. To this end a search travel is performed with the collected information on one of the two edges 2, 7 of the corner A up to the neighboring corner point B. After the position and the angle of the second corner point B have been evaluated, a search travel is performed on the newly localized edge 8 up to the third corner point C. With this information the length and width of plate 1 are determined.

The invention can also be used for detecting an existing structural part as a manufacturing model for a new structural part, for digitalizing a technical drawing of a structural part to be cut and for recording and detecting remaining plates. This shall be explained in more detail in the following:

2. DETECTION OF COMPONENTS

The structural parts are recorded with the CMOS or CCD camera and the inner and outer contours are digitalized. The digitalized structural part is made available for the further processing of other applications.

When the structural part is smaller than the size of the recording produced by means of the camera, the contours are directly digitalized from the recording.

If the component is larger than the size of the recording area of the camera, several recordings are made in sections or rasters in x- and y-direction and put together by means of the stitching technique to form one image. The inner and outer contours of the structural part are then digitalized from this image.

FIG. 4 schematically shows an image 40 of a structural part 42 with inner contour 43 and outer contour 44, which image is composed of a total of six recordings 41. The image 40 is digitalized for detecting the contours (43; 44) of the structural part.

3. DIGITALIZATION OF DRAWINGS

A technical drawing contains one or more structural parts. With a CMOS or CCD camera the drawing is recorded and the inner and outer contours are digitalized. The digitalized part or parts is/are made available for further processing of other applications.

In case the drawing is smaller than the size of the recording made by means of the camera, the workpiece contour is directly digitalized from the recording.

If the drawing is greater than the size of the recording area of the camera, several recordings are made raster by raster in x- and y-direction and composed, for instance by means of the stitching technique, to form one image. Subsequently, the inner and outer contours of the workpiece are digitalized from this image.

4. RECORDING OF REMAINING PLATES

The recording of remaining plates is schematically illustrated in FIG. 5. To record a remaining plate 51, the camera is moved by means of the machine control raster by raster in x- and y-direction over the whole plate surface to record individual pictures or frames 52 of the plate 51. The frames are composed to obtain a total image 50, and the inner contours 53 and the outer contours 54 are digitalized. The digitalized remaining plate 51 is made available for the further processing of other applications.

In detail, the following tasks are fulfilled with the method and the device according to the invention by means of a co-traveling or stationary CMOS camera or CCD camera:

Finding a workpiece (of a plate) on the cutting table and subsequent evaluation of the position (e.g. by means of a start corner point of the plate and the positional angle relative to the machine coordinate system) and the dimensions (length, width).

Recording workpieces and digitalizing the inner and outer contours. The digital workpiece information is reported back to the machine control and serves the cutting of the structural part, particularly for nesting with the structural part contours of structural parts to be cut.

Recording and digitalizing drawings for determining structural parts, or nesting plans. The digital data of the structural part or the drawing are reported to the machine control and serve the cutting of the structural part, particularly nesting.

Recording a remaining metal sheet and evaluation by digitalizing the outer contours and possible inner contours. The digital data are adopted in the machine control. Structural part contours of structural parts to be cut can be nested into the remaining metal sheet.

The advantages of the method of the invention are above all a high precision of the measurement, a rapid run of the measurement, a high automatization degree and independence as far as materials are concerned.

The procedures explained above in more detail share a common concept for determining edges and contours of a workpiece (be it a plate to be cut, a real sample part or in the form of a technical drawing of a part or as a remaining part), which shall be explained in more detail in the following.

The concept comprises a first detection step in which a "light/dark comparison" of the workpiece and its surroundings (this is normally a support, such as a cutting table) is made by means of the camera, and a second detection step in which an optical recording is made on the basis of a position (such as an edge position) determined by way of the light/dark comparison and said recording is subsequently evaluated.

The light/dark comparison is carried out with a first lower optical resolution, and the optical recording intended for evaluation is carried out with a second higher optical resolution. The light/dark comparison is e.g. carried out in that the camera is operated in a black/white mode. The lower resolution permits a faster detection of light/dark patterns and possibly a rapid relative movement between camera and workpiece. To this end the workpiece surface is preferably irradiated by means of a lamp such that it appears extremely bright (extremely white) and the support extremely dark. In a light/dark comparison the edges of the workpiece are thereby detected rapidly, accurately and reproducibly. For this purpose the camera settings may also be helpful, for instance, by setting a high contrast.

In practice, however, the support of the workpiece often exhibits light areas, for instance, when the workpiece is supported on a cutting grid, or with the edge of a technical drawing. These may falsify the determination of the edge position. According to the invention these areas are eliminated in the course of the light/dark comparison in the following way and the exact edge position of the workpiece is thereby determined: As a rule, the camera detects (almost) exclusively light (white) pixels across the workpiece surface. These pixels are evaluated, for instance counted. In the area of the workpiece edge more and more dark (black) pixels are detected; these, however, may be surrounded by light pixels (bars of the cutting grid). With a distinct increase in dark pixels an edge should be assumed. To avoid a passing over the edge, the camera is again moved back some distance.

Subsequently, the areas with light pixels are mathematically or optically reduced in size or eliminated, for instance by mathematically enlarging the dark areas, or by excessive illumination or overmodulation of the camera. As a consequence, the minor areas with the light pixels will disappear, so that in the end the border between light workpiece edge and dark surroundings remains clearly visible. Its position can thus be detected accurately. The displacement of the edge produced by mathematically or optically decreasing the light pixel areas can be easily taken into account and corrected accordingly.

After the determination of the edge position has been completed, a recording of the edge with a higher optical resolution is made in the second detection step. This recording permits a more accurate evaluation of the edge position. This recording is preferably present as a color photo, particularly preferably as a gray scale photo.

Location and position of the workpiece edge relative to the machine coordinate system is thereby determined in an exact, reproducible and fast way.

The invention claimed is:

1. A method for machine-cutting a plate-shaped workpiece, said method comprising:
   contactless optical recording of data regarding position, geometry or dimensions of the workpiece using a camera, and evaluating the recorded data using image processing,
   wherein the recording of the data comprises a first method step of coarsely locating a workpiece edge, in which the camera is operated in a first operative mode with a first optical resolution, and a second method step for determining more exact positional data of the workpiece edge, in which the camera is operated in a second operative mode with a second optical resolution higher than said first optical resolution; and
   wherein the recording operation comprises:
   a) positioning the camera such that a recording of a first sub-area of a surface of the workpiece is obtained;
   b) setting first recording parameters of the camera corresponding to the first operative mode such that the recording shows a high white level with predominantly white pixels, and evaluating the recording to obtain a first group of recording and positional data;

c) moving the camera in the first operative mode in a predetermined direction of movement on a predetermined movement path such that a recording of a second sub-area is obtained, said second sub-area being offset from the first sub-area and overlapping said first sub-area in an overlap region, and evaluating the recording of said second sub-area to obtain a second group of recording and positional data;

d) matching the recording data of the first and the second group or evaluating the recording data only of the second sub-area as to detect whether or not a white level of the recording of the second sub-area is less than a predetermined relative or absolute limit value, and thereafter e) responsive to detecting that the white level of the recording of the second sub-area is not less than said predetermined relative or absolute limit value, further moving the camera in the first operative mode in the predetermined direction of movement and by a predetermined movement distance and iteratively repeating method steps c) and d) so as to record and evaluate the recording data of at least a further sub-area; or f) where the white level of the recording of the second sub-area is detected as being less than said predetermined relative or absolute limit value, setting second recording parameters that correspond to the second operative mode of the camera and at a higher resolution than the first recording parameters, and producing a recording of a higher resolution from the sub-area with a white level below the limit value, and evaluating the higher resolution recording with respect to the position of a workpiece edge.

2. The method according to claim 1, wherein an image in the area of the workpiece edge is generated using the camera during operation in the second operative mode with the second higher optical resolution, and the image is evaluated using image processing.

3. The method according to claim 1, wherein the first recording parameters of the camera in method step b) are set such that the recording shows a white level with at least 80%, white pixels.

4. The method according to claim 1, wherein, where the white level of the recording of the second sub-area is detected as being less than said predetermined relative or absolute limit value, method step f) is preceded by a measure in which surface areas of a recording with predominantly black pixels are optically or mathematically eliminated.

5. The method according to claim 1, wherein, where the white level of the recording of the second sub-area is detected as being less than said predetermined relative or absolute limit value, method step f) is preceded by a measure in which the camera is moved back to the sub-area with a white level below the limit value in a direction opposite to the direction of movement.

6. The method according to claim 1, wherein the movement of the camera according to method step c) takes place at a movement speed of at least 20 m/min.

7. The method according to claim 1, wherein the limit value according to method step d) is variably set in dependence upon the white level of the first sub-area recording.

8. The method according to claim 1, wherein the camera is a gray scale camera.

9. The method according to claim 1, wherein in the first operative mode the aperture of the camera is set such that a depth of focus of at least 20 mm is obtained.

10. The method according to claim 1, wherein the camera has an automatic zoom.

11. The method according to claim 1, wherein the camera is adjustable in height.

12. The method according to claim 1, wherein a camera has a wide-angle lens.

13. The method according to claim 1, wherein the first recording parameters of the camera in method step b) are set such that the recording shows a white level with at least 90%, white pixels.

14. The method according to claim 1, wherein the movement of the camera according to method step c) takes place at a movement speed of at least 35 m/min.

15. The method according to claim 1, wherein in the first operative mode the aperture of the camera is set to obtain a depth of focus of at least 30 mm.

* * * * *